(12) United States Patent
Ohsawa et al.

(10) Patent No.: US 7,750,578 B2
(45) Date of Patent: Jul. 6, 2010

(54) DISCHARGE LAMP BALLAST APPARATUS

(75) Inventors: Takashi Ohsawa, Tokyo (JP); Yasutaka Inanaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 180 days.

(21) Appl. No.: 11/666,231

(22) PCT Filed: Nov. 15, 2005

(86) PCT No.: PCT/JP2005/020957

§ 371 (c)(1),
(2), (4) Date: Apr. 25, 2007

(87) PCT Pub. No.: WO2006/087853

PCT Pub. Date: Aug. 24, 2006

(65) Prior Publication Data

US 2008/0284339 A1 Nov. 20, 2008

(30) Foreign Application Priority Data

Feb. 21, 2005 (JP) ............................. 2005-044274

(51) Int. Cl.
*H05B 41/16* (2006.01)
(52) U.S. Cl. .................... 315/246; 315/82; 315/326
(58) Field of Classification Search ............. 315/77, 315/82, 246, 326, 94, 209 R, 219, 276, 291; 307/10.1, 10.8; 362/459
See application file for complete search history.

(56) References Cited

U.S. PATENT DOCUMENTS

| | | | | |
|---|---|---|---|---|
| 5,879,073 A | * | 3/1999 | Hori et al. | 362/344 |
| 5,949,192 A | * | 9/1999 | Kominami et al. | 315/94 |
| 6,309,089 B1 | * | 10/2001 | Yoneyama et al. | 362/263 |
| 6,737,810 B2 | * | 5/2004 | Hochi et al. | 315/39 |
| 7,023,144 B2 | * | 4/2006 | Suzuki et al. | 315/246 |
| 7,378,803 B2 | * | 5/2008 | Hendrix | 315/246 |
| 7,598,676 B2 | * | 10/2009 | Serita et al. | 313/623 |
| 2005/0140295 A1 | * | 6/2005 | Van Den Nieuwenhuizen | 313/567 |

FOREIGN PATENT DOCUMENTS

DE 44 00 412 A1 7/1994

(Continued)

OTHER PUBLICATIONS

German Office Action for Appl. No. 11 2005 003 174.8-54, Oct. 2, 2009 with English Translation (8 pages).

*Primary Examiner*—Douglas W Owens
*Assistant Examiner*—Tung X Le
(74) *Attorney, Agent, or Firm*—Birch, Stewart, Kolasch & Birch, LLP

(57) ABSTRACT

A discharge lamp ballast apparatus has a reflecting mirror 2 and a power source circuit 5. The reflecting mirror 2 is disposed around a discharge light bulb 1 in such a manner as to cast light from the discharge light bulb 1 in one direction. The power source circuit 5 applies a start pulse of a negative potential with respect to the potential of the reflecting mirror 2 to an electrode 6 located at a side with the higher electric field concentration produced between electrodes 6 and 7 to which a high voltage of the start pulse is applied. This makes it possible to produce a dielectric breakdown near the electrode 6, and makes it easier to start the discharge light bulb 1.

3 Claims, 7 Drawing Sheets

FOREIGN PATENT DOCUMENTS

| | | |
|---|---|---|
| DE | 695 14 181 T2 | 3/1996 |
| DE | 197 37 640 A1 | 3/1998 |
| DE | 698 16 950 T2 | 8/2003 |
| JP | 2-54639 B2 | 11/1990 |
| JP | 05-266984 A | 10/1993 |
| JP | 6-111965 A | 4/1994 |
| JP | 6-203984 A | 7/1994 |
| JP | 10-074404 A | 3/1998 |
| JP | 10-241874 A | 9/1998 |
| JP | 2005-129400 A | 5/2005 |

* cited by examiner

DISCHARGE LAMP BALLAST APPARATUS

TECHNICAL FIELD

The present invention relates to a discharge lamp ballast apparatus for starting a discharge lamp effectively, and more particularly to a discharge lamp ballast apparatus suitable for starting discharge lamps used as headlights of a vehicle.

BACKGROUND ART

As a conventional discharge lamp ballast apparatus for turning on a discharge lamp such as an HID (high-intensity discharge) lamp with a DC voltage, there is an apparatus that supplies a steady ballast voltage to the discharge lamp from a DC power source circuit; causes a starter to generate a one-directional high-voltage pulse for starting (referred to as a "start pulse" from now on) opposite in direction to the steady ballast voltage; and produces a dielectric breakdown between the two electrodes of the discharge lamp by superimposing the start pulse on the steady ballast voltage, thereby starting the discharge lamp. Superimposing the start pulse opposite in direction on the steady ballast voltage is carried out because it produces good experimental results (see Patent Document 1, for example).

As another conventional discharge lamp ballast apparatus, there is an apparatus that turns on the discharge lamp such an HID lamp by applying a square wave voltage. The apparatus has a DC power source circuit, an inverter circuit, a start signal output circuit, and a start pulse generating circuit, and turns on the discharge lamp by periodically inverting the DC voltage output from a DC power source circuit through an inverter circuit. To start the discharge lamp, the start signal output circuit detects the operation of the inverter circuit, drives the start pulse generating circuit at a time when a high-potential voltage is applied from the inverter circuit to the discharge lamp, and starts the discharge lamp by superimposing the start pulse output from the start pulse generating circuit on the pulse voltage output from the inverter circuit. Thus superimposing the start pulse on the high-potential pulse voltage and applying it to the discharge lamp facilitates the dielectric breakdown between the electrodes (see Patent Document 2, for example).

As for a discharge lamp turned on by a DC voltage, it has an anode and a cathode separately, and it sometimes becomes blurred or fragile because of the adhesion of ions to silica glass near the cathode. As still another conventional discharge lamp ballast apparatus, there is an apparatus that places a proximity conductor near the cathode of the DC discharge lamp, and maintains the proximity conductor at the same potential as the cathode of the DC discharge lamp, thereby preventing the fogginess. The discharge lamp ballast apparatus has a pair of start circuits having different application direction or application polarity of the high-voltage pulse at the anode side and cathode side of the DC discharge lamp, respectively. To start the DC discharge lamp, the individual start circuits supply the DC discharge lamp with positive start pulses and negative start pulses which are switched at random, thereby starting the discharge lamp surely and immediately. Thus applying the positive start pulses and negative start pulses at random to the DC discharge lamp makes it possible to improve the starting characteristics by starting the discharge by the negative start pulses when the DC discharge lamp is cold, and by the positive start pulses when restarting it (see Patent Document 3, for example).

Patent Document 1: Japanese patent publication No. 2-54639/1990 (pages 2 and 3, and FIGS. 3-8).

Patent Document 2: Japanese patent application laid-open No. 5-266984/1993 (pages 3-5, and FIG. 1)

Patent Document 3: Japanese patent application laid-open No. 10-241874/1998 (pages 4 and 5, and FIGS. 1-3)

With the foregoing configurations, the conventional discharge lamp ballast apparatuses have a problem of requiring a large amount of energy to start the discharge lamp. This is because they start the discharge lamp by applying the start pulse between the electrodes without considering the conditions between the electrodes of the discharge lamp, and hence the use efficiency of the start pulse is low.

The present invention is implemented to solve the foregoing problem. Therefore it is an object of the present invention to provide a discharge lamp ballast apparatus capable of starting the discharge lamp efficiently by applying a start pulse that will make a potential gradient steep around the electrode for emitting electrons.

DISCLOSURE OF THE INVENTION

The discharge lamp ballast apparatus in accordance with the present invention includes a reflecting mirror disposed around a discharge lamp to cast light from the discharge lamp in one direction; and a power source circuit for applying a start pulse having a negative potential with respect to a potential of the reflecting mirror, to a discharge electrode on a side having higher concentration of an electric field which is produced between discharge electrodes supplied with a high voltage of the start pulse.

This offers an advantage of being able to start the discharge lamp efficiently.

BEST MODE FOR CARRYING OUT THE INVENTION

The best mode for carrying out the invention will now be described with reference to the accompanying drawings to explain the present invention in more detail.

Embodiment 1

Figure 1:
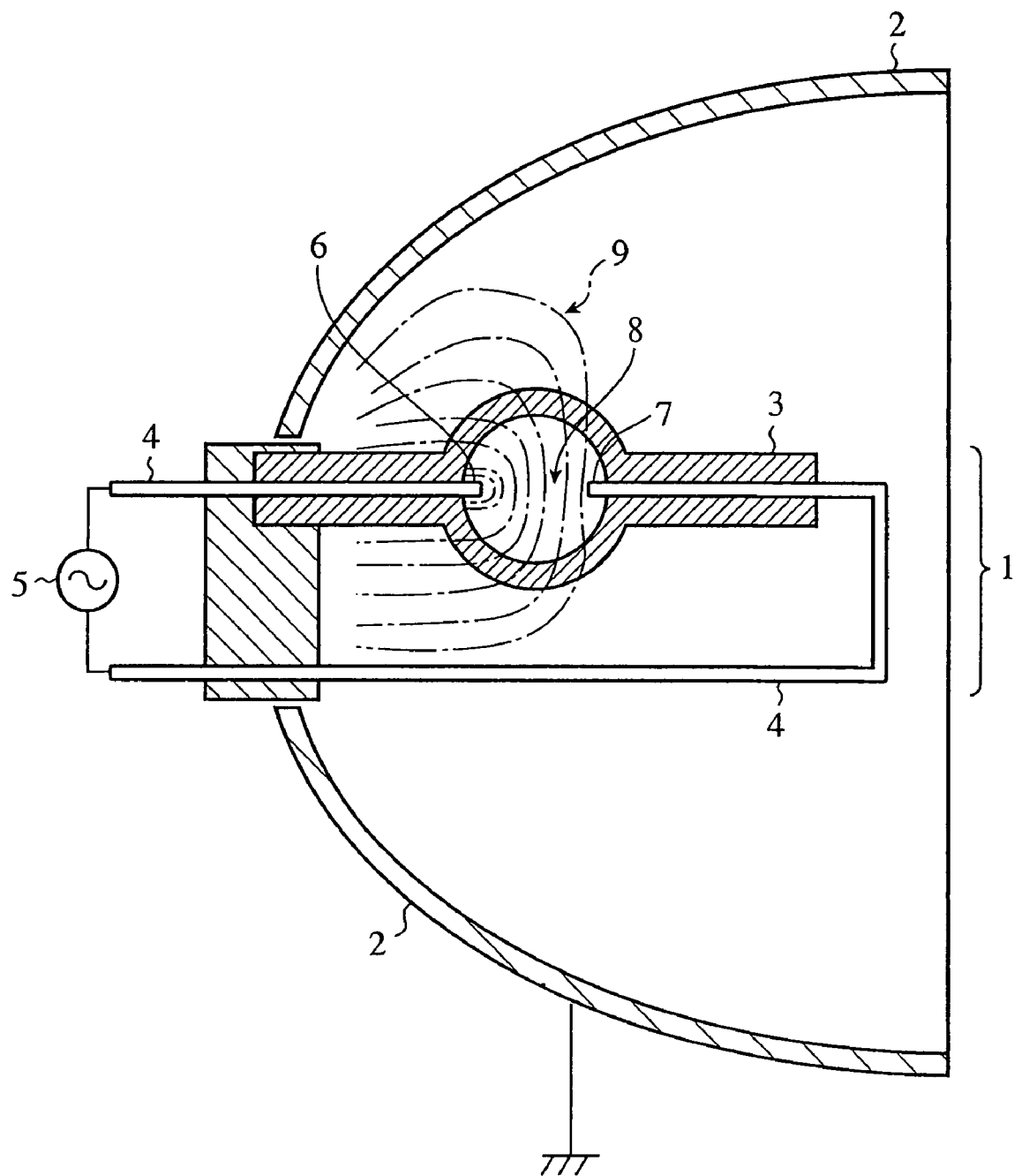
FIG. 1 is a diagram illustrating a configuration of a discharge lamp ballast apparatus of an embodiment 1 in accordance with the present invention.

FIG. 1 is a diagram illustrating a configuration of a discharge lamp ballast apparatus of an embodiment 1 in accordance with the present invention. A discharge light bulb 1 such as an HID, which is a discharge lamp, is placed at or near the concave center of the reflection plane of a concave mirror, that is, a reflecting mirror 2. The discharge light bulb 1 has a light-emitting tube 3 and leading wires 4 composed of a conductive material. To the ends of the two leading wires 4, which are pulled out of the light-emitting tube 3, a power source circuit 5 is connected for supplying the discharge light bulb 1 with ballast power. The two leading wires 4 are connected to electrodes 6 and 7 inside the light-emitting tube 3, respectively. The electrodes 6 and 7 are discharge electrodes placed oppositely at both sides of a discharge gap 8 inside the light-emitting tube 3. The electrode 6 is placed at a deeper side of the concave of the reflection plane of the reflecting mirror 2 when seen from the opening side thereof, and the electrode 7 is placed closer to the opening than the electrode 6. In addition, the light-emitting tube 3 is filled with a gas such as a xenon gas. The light-emitting tube 3 is fixed to the reflecting mirror 2 in such a manner that the electrode 6 and electrode 7 are aligned in the direction of the normal to the center of the reflection plane of the reflecting mirror 2. Thus mounting the light-emitting tube 3 makes the electrode 6 closer to the reflecting mirror 2 than the electrode 7.

The reflecting mirror 2 can be composed of a conductive material in its entirety, or of a non-conductive material as its main body, the internal wall of which is coated with a conductive layer, or part of the internal wall of which has a conductor facing the electrodes. Thus, the reflecting mirror 2 makes its potential constant by grounding the conductive layer. A plurality of equipotential lines 9 indicated by dashed-and-dotted lines show intensity distribution of the electric field produced inside the discharge light bulb 1 and its surroundings, that is, on the reflection plane side of the reflecting mirror 2.

Figure 2:
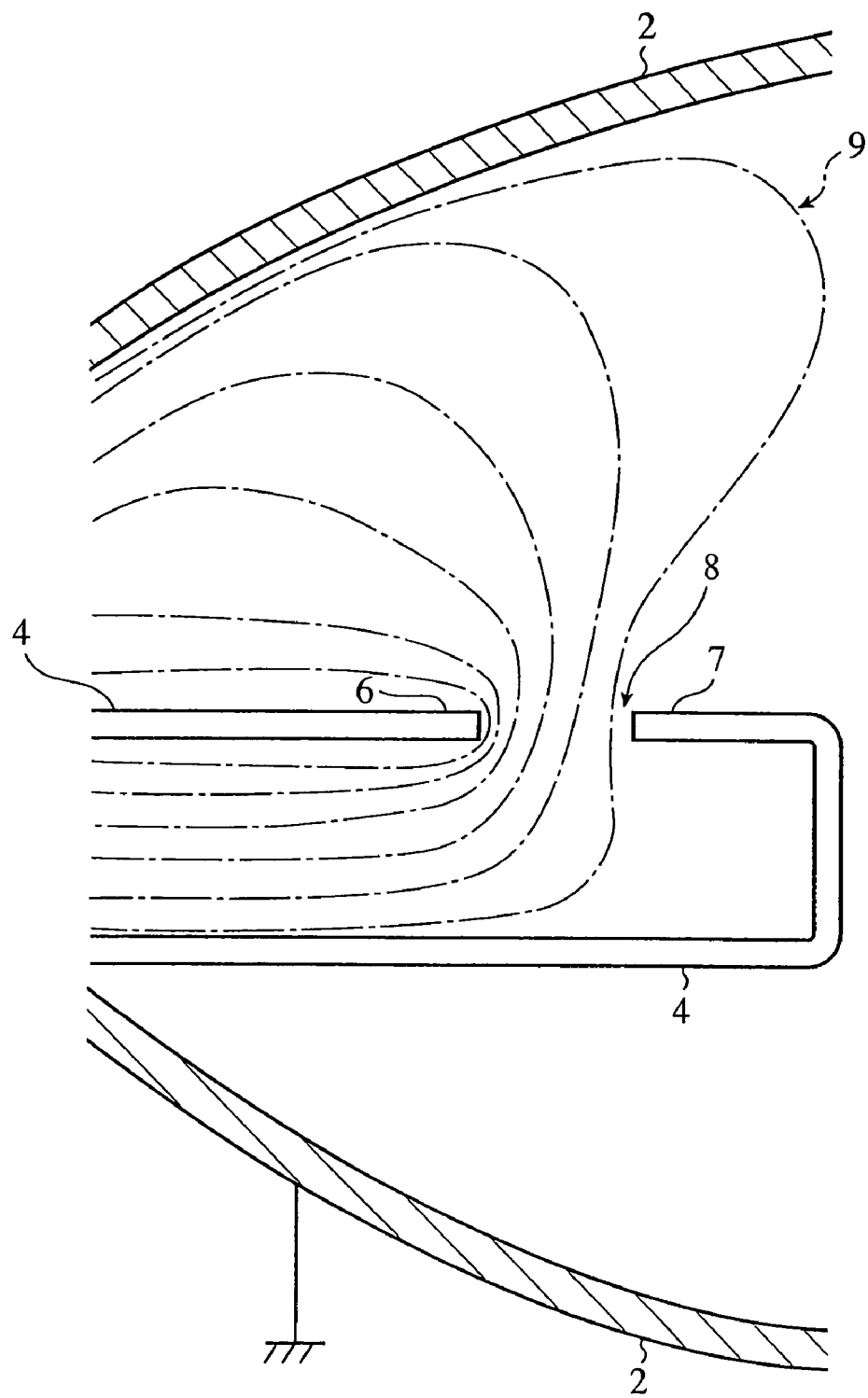
FIG. 2 is a diagram illustrating an electric field produced in a discharge light bulb of the discharge lamp ballast apparatus of the embodiment 1.

FIG. 2 is a diagram illustrating an electric field produced in the discharge light bulb of the discharge lamp ballast apparatus of the embodiment 1. In FIG. 2, the same portions as those of FIG. 1 are designated by the same reference numerals, and their description will be omitted. FIG. 2 illustrates by the plurality of equipotential lines 9 the behavior of the influence the grounded reflecting mirror 2 and the leading wires 4, which apply the voltage of the power source circuit 5, have over the electric field produced around the electrodes 6 and 7 inside the light-emitting tube 3 as shown in FIG. 1.

Next, the operation will be described.

The power source circuit 5 as shown in FIG. 1 generates a DC high voltage and applies it to the discharge light bulb 1. In addition, it generates a start pulse of a few tens of kilovolts, and superimposes it on the high voltage to cause a breakdown between the electrodes of the discharge light bulb 1, thereby turning on the light. After the turning-on, the power source circuit 5 reduces the voltage applied to the discharge light bulb 1 with the stabilization of the discharge phenomenon, and maintains the steady lighting by applying a prescribed AC voltage.

In most cases, as shown in FIG. 1, the discharge light bulb 1 is surrounded by the reflecting mirror 2 for sending forth the light from the light-emitting tube 3 in one direction. In addition, the discharge light bulb 1 has the leading wire 4 connected to the electrode 7 and placed near the outside of the light-emitting tube 3. The leading wire 4 connected to the electrode 7 is mounted in such a manner as to be pulled out of an end in the longitudinal direction of the light-emitting tube 3, to make a turn at that end and pass by the outer side of the light-emitting tube 3. Thus, the leading wire 4 is extended in parallel with the discharge gap 8 within the light-emitting tube 3, having a section placed on the electrode 6 side. The leading wire 4 and the grounded reflecting mirror 2, which are placed outside the light-emitting tube 3, have a certain potential each. Accordingly, they have an influence on the electric field produced in the discharge gap 8, on the electrons emitted from the electrode 6, and on the turn-on characteristics of the discharge light bulb 1.

As the equipotential lines 9 illustrated in FIG. 2, the influence of the leading wire 4 along the side of the reflecting mirror 2 and light-emitting tube 3 brings about concentration of the electric field, thereby causing an electric field having uneven potential gradients near the electrodes 6 and 7. The ballast voltage supplied from the power source circuit 5 to the discharge light bulb 1 causes a potential difference between the electrode 6 and electrode 7. When the power source circuit 5 applies a high voltage to the electrode 6, for example, the difference between the potential of the reflecting mirror 2 and the potential of the electrode 6 increases. In contrast, the difference between the potential of the reflecting mirror 2 and the potential of the electrode 7 becomes comparatively small or the same. In addition, as described before, the electrode 6 is closer to the reflecting mirror 2 than the electrode 7 is. Thus, in the neighborhood of the electrode 6, the equipotential lines 9 are denser and the concentration of the electric field is higher as illustrated in FIG. 2. Grounding the reflecting mirror 2 to fix the potential, and applying a negative high voltage to the electrode 6 placed on the side at which the concentration of the electric field is higher will make the potential gradient steep at the tip of the electrode 6, thereby increasing the intensity of the electric field locally as compared with its surroundings. Thus, at the tip of the electrode 6 having the high electric field intensity thereabout, the dielectric breakdown of the gas sealed in the light-emitting tube 3 is easy to occur. Accordingly, the discharge light bulb 1 starts efficiently when the start pulse is applied to the electrode 6.

Figure 3A:
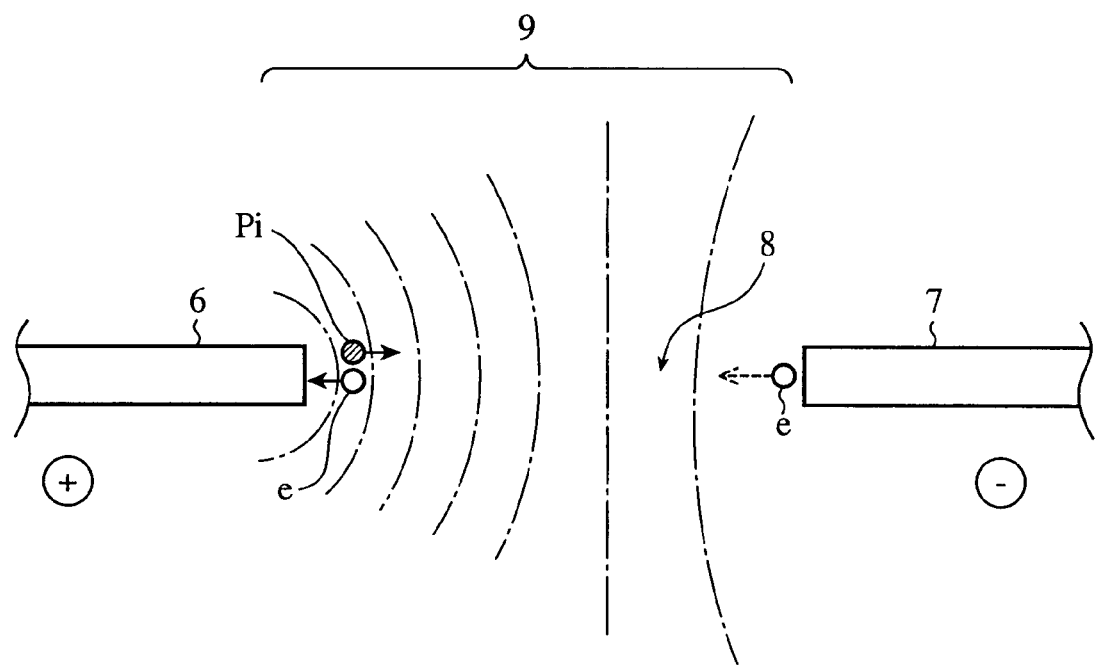
FIG. 3A is a diagram illustrating a flow of electrons across the electrodes of the discharge light bulb.
Figure 3B:
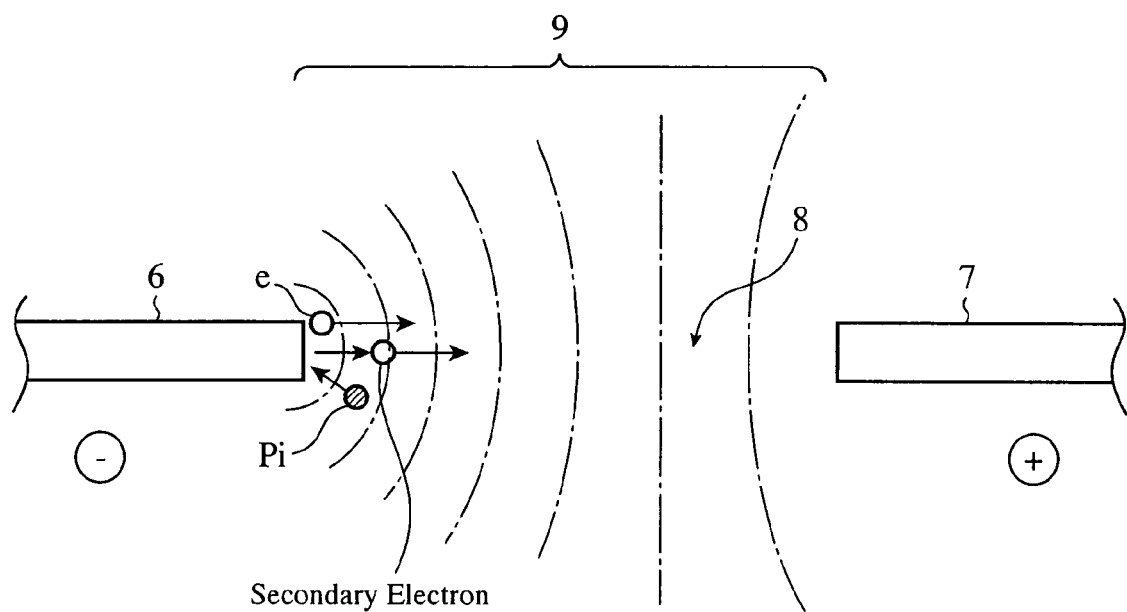
FIG. 3B is a diagram illustrating a flow of electrons across the electrodes of the discharge light bulb.

FIG. 3A and FIG. 3B are diagrams illustrating a flow of electrons across the electrodes of the discharge light bulb. In FIG. 3A and FIG. 3B, the same or like portions to those of FIG. 2 are designated by the same reference numerals, and their description will be omitted. FIG. 3A illustrates electrons e and ions pi of the gas sealed in the light-emitting tube 3, which move across the discharge gap 8 when the high voltage is applied with placing the electrode 6 at a positive side and the electrode 7 at a negative side. FIG. 3B illustrates electrons e moving across the discharge gap 8 when the high voltage is applied with placing the electrode 6 at a negative side and the electrode 7 at a positive side.

As illustrated in FIG. 3A, the dielectric breakdown, which is produced by applying the positive high voltage to the electrode 6 whose neighborhood has a higher intensity electric field, resolves the gas sealed in the light-emitting tube 3 into electrons e and ions pi around the electrode 6. Since the ions pi travel to the negative side electrode 7 slowly, they move across the discharge gap 8 slowly, causing a current to flow. Thus, it takes a long time for the current to flow from the electrode 6 to the electrode 7. In addition, since an increase in the current between the electrodes 6 and 7 is small, it takes a long time to make transition to glow discharge.

For this reason, to start the discharge turn-on by applying a start pulse of a positive potential high voltage to the electrode 6, it is necessary to apply the high voltage between the electrodes 6 and 7 for a long time. In other words, a start pulse with a broad pulse width is required. Thus, it is necessary to generate as a start pulse a high voltage whose initial quasi-sinusoidal half wave has a long period.

In contrast, as illustrated in FIG. 3B, the dielectric breakdown, which is produced by applying the negative high voltage to the electrode 6 whose neighborhood has a high intensity electric field, causes the electrons e emitted from the electrode 6 to move across the discharge gap 8 quickly, reaching the positive side electrode 7 in a short time. On the other hand, the ions pi generated near the electrode 6 reach the electrode 6 in a short time, and collide against the surface of the electrode 6. Thus, the ions pi contribute to multiplying the electrons by generating secondary electrons from the electrode 6, which increases the current flowing between the electrodes 6 and 7 quickly, thereby making rapid transition to the glow discharge.

Thus, when starting the turn-on by applying the negative high voltage start pulse to the electrode 6, the dielectric breakdown between the electrodes 6 and 7 is produced in a short time. Accordingly, it is possible to use a start pulse that keeps the high voltage for only a short time, that is, a pulse with a narrow pulse width. Consequently, as will be described later, a high voltage whose initial quasi-sinusoidal half wave has a short period can be used as the start pulse.

This makes it possible to facilitate producing the dielectric breakdown between the electrodes 6 and 7 and emitting the electrons e, and to increase the probability of starting the discharge light bulb 1 with a single start pulse by placing, for example, the electrode 6 to which the high voltage is applied, at the negative potential with respect to the reflecting mirror 2 around that electrode.

Thus, to produce the dielectric breakdown between the electrodes 6 and 7 using the start pulse with a narrow pulse width and small energy, it is preferable to generate the initial quasi-sinusoidal half wave of the start pulse in such a manner that it has a voltage polarity opposite to the voltage having been applied across the electrodes.

Figure 4:
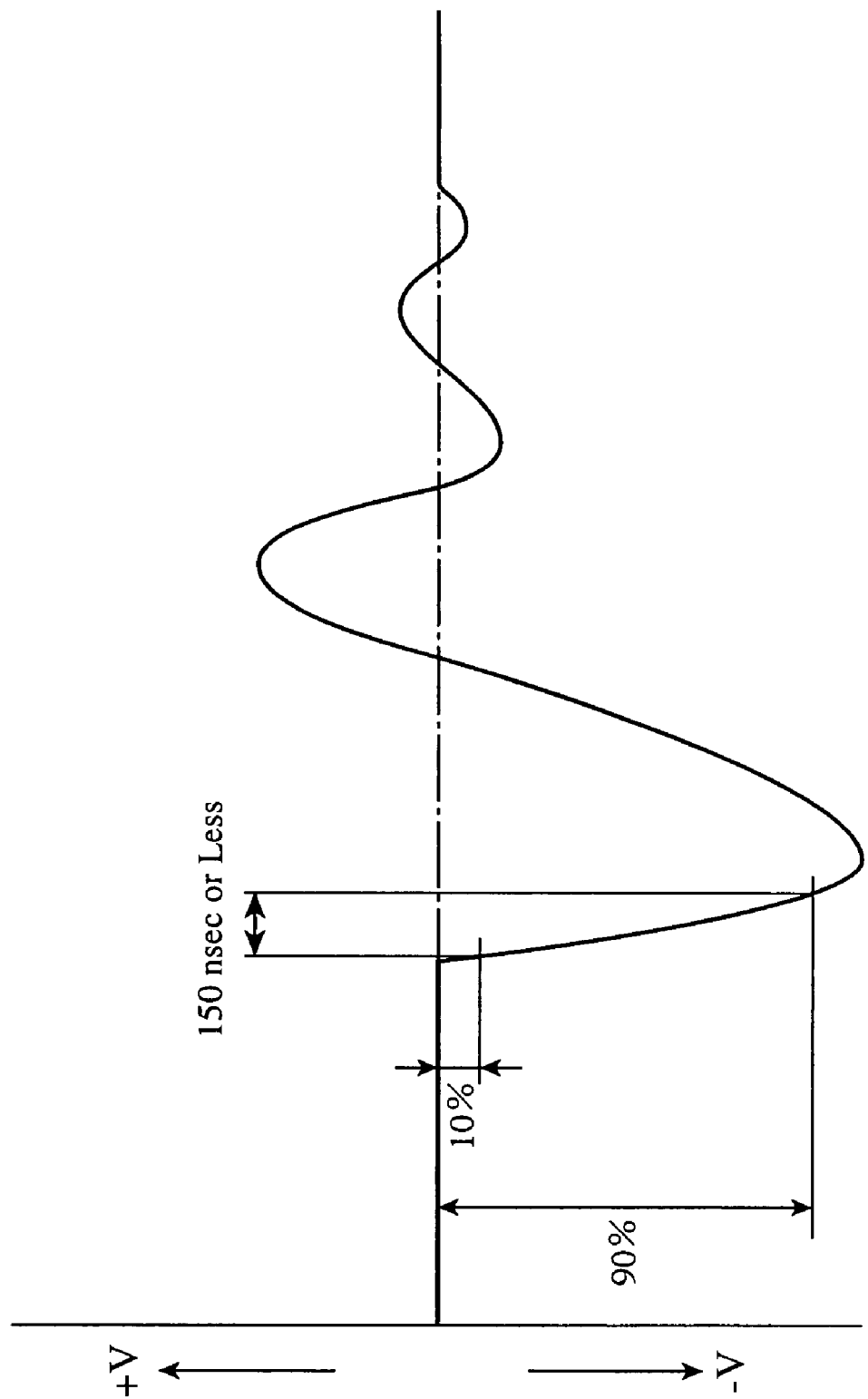
FIG. 4 is a diagram illustrating a start pulse of the discharge lamp ballast apparatus of the embodiment 1.

FIG. 4 is a diagram illustrating the start pulse of the discharge lamp ballast apparatus of the embodiment 1. FIG. 4 illustrates a voltage waveform of the start pulse that is generated by the power source circuit 5 of FIG. 1 and is applied to the electrode 6 of the discharge light bulb 1 to start the discharge light bulb 1. The start pulse the power source circuit 5 generates is a wave, more specifically, which decays quickly while oscillating as a quasi-sinusoidal wave. Among these waveforms, the high voltage of the initial quasi-sinusoidal half wave is used as the start pulse. As described before, it is effective to apply the start pulse of the negative voltage to the electrodes 6 and 7 to start lighting with the start pulse of a narrow pulse width. Consider a case when the distance between the electrodes 6 and 7 is equal to or less than 5 mm, and a narrow pulse-width start pulse is applied which rises from 10% to 90% of the peak value of the initial quasi-sinusoidal half wave that takes the highest voltage in a short time equal to or less than 150 nsec. In this case, it is particularly effective to employ a negative potential start pulse. That the high voltage of the initial quasi-sinusoidal half wave is generated as a negative potential makes it possible to employ a compact power source circuit 5 which generates the start pulse with a narrow pulse width. More specifically, the power source circuit 5 including a small igniter circuit can be employed.

Incidentally, even when the start pulse, which has a broad pulse width and rises up slowly with a value greater than the foregoing value, is applied between the electrodes 6 and 7, it is effective to make the initial quasi-sinusoidal half wave with a high voltage a negative potential.

Figure 5:
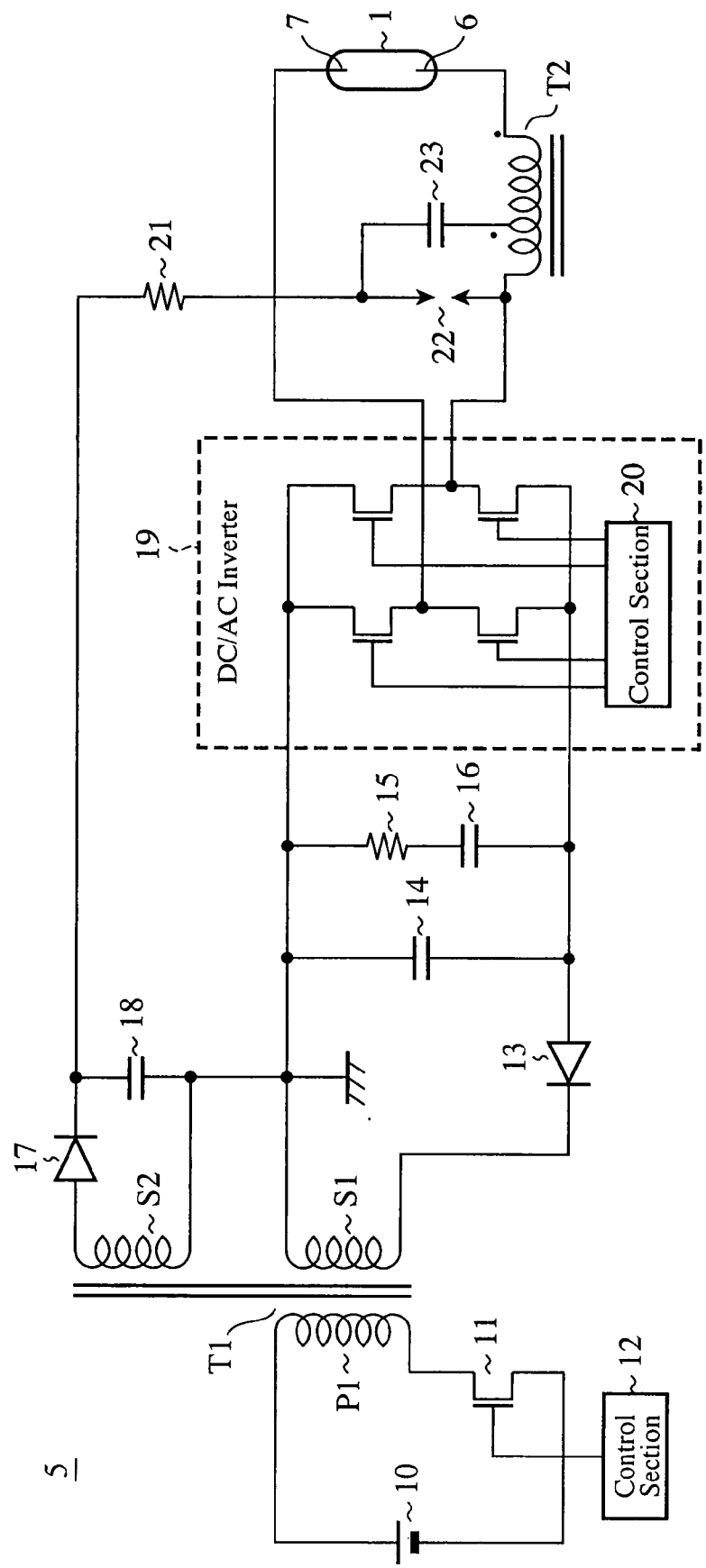
FIG. 5 is a circuit diagram showing a configuration of a power source circuit of the discharge lamp ballast apparatus of the embodiment 1.

FIG. 5 is a circuit diagram showing a configuration of the power source circuit 5 of the discharge lamp ballast apparatus of the embodiment 1. In FIG. 5, the same portions as those of FIG. 1 and so forth are designated by the same reference numerals, and their duplicate description will be omitted. A power source 10 for supplying the DC voltage has its positive electrode connected to a first terminal of the primary winding P1 of a transformer T1. A second terminal of the primary winding P1 is connected to the negative electrode of the power source 10 via a switching device 11. The switching device 11 has its control terminal such as a gate terminal connected to a control section 12 for controlling its switching operation. The transformer T1 has a first terminal of its secondary winding S1 grounded, and a second terminal connected to the cathode of a diode 13. The diode 13 has its anode connected to first ends of capacitors 14 and 16. The capacitor 16 is connected in series with a resistor 15. A first end of the resistor 15 and a second end of the capacitor 14 are connected to the first terminal of the secondary winding S1 of the transformer T1.

The transformer T1 has a first terminal of its secondary winding S2 connected to the anode of a diode 17 which has its cathode connected to a capacitor 18. The capacitor 18 has its second end connected to a second terminal of the secondary winding S2 and to the first terminal of the secondary winding S1, which are grounded.

The DC voltage generated by the diode 13, capacitor 14, resistor 15 and capacitor 16 is supplied to a DC/AC inverter 19. The DC/AC inverter 19 is composed of a plurality of switching devices constituting an H-type bridge circuit, and a control section 20 for controlling the operation of each switching device.

In addition, the transformer T1, switching device 11, control section 12, diode 13, capacitor 14, resistor 15, capacitor 16, diode 17 and capacitor 18 constitute a DC/DC converter for boosting the DC voltage of the power source 10.

The DC/AC inverter 19 is connected to the discharge light bulb 1 via an igniter circuit composed of a resistor 21, gap switch 22, capacitor 23 and igniter transformer T2. The resistor 21 has its first end connected to the cathode of the diode 17 and to the first end of the capacitor 18. The resistor 21 has its second end connected to a first end of the capacitor 23 and to a first end of the gap switch 22. The igniter transformer T2 is an autotransformer having a single winding. It has a common terminal serving as a start side terminal of the primary winding and as an end side terminal of the secondary winding. The common terminal is connected to a second end of the capacitor 23. The primary winding has its end side terminal connected to a second end of the gap switch 22 and to a first output terminal of the DC/AC inverter 19. The DC/AC inverter 19 has its second output terminal connected to the electrode 7 of the discharge light bulb 1. The igniter transformer T2 has the start side terminal of its secondary winding connected to the electrode 6 of the discharge light bulb 1.

Figure 6:
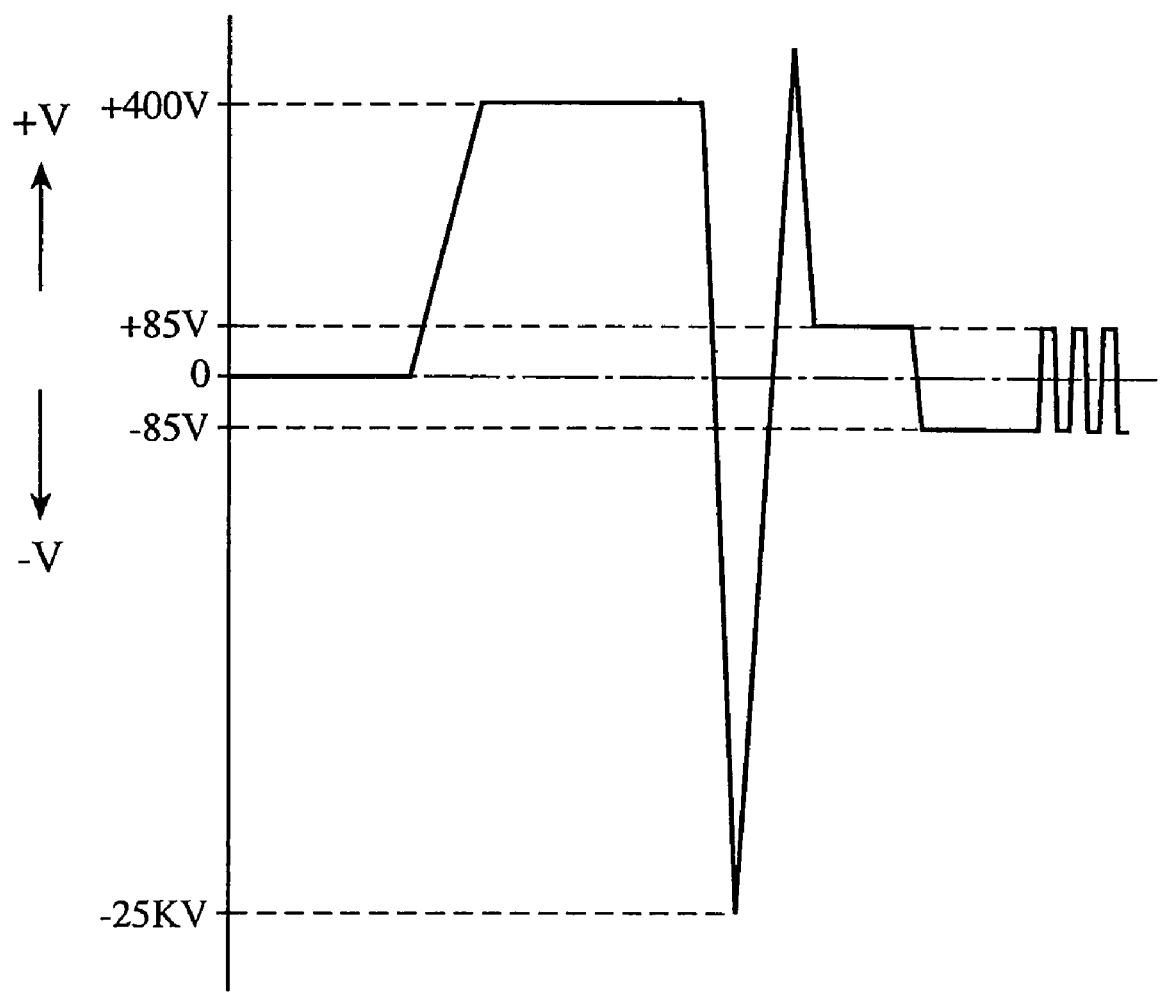
FIG. 6 is a diagram illustrating the operation of the discharge lamp ballast apparatus of the embodiment 1.

FIG. 6 is a diagram illustrating the operation of the discharge lamp ballast apparatus of the embodiment 1. FIG. 6 illustrates variations in the voltage applied to the electrode 6 with reference to the electrode 7 of the discharge light bulb 1. The power source circuit 5 shown in FIG. 5 rectifies the voltage generated across the secondary winding S1 of the transformer T1 with the diode 13, capacitor 14, resistor 15 and capacitor 16, thereby generating a DC voltage of 400 V, for example. The DC voltage is supplied to the DC/AC inverter 19, which converts it into a pulse-like AC voltage that reverses its polarity at a prescribed frequency under the control of the control section 20, and applies it to the discharge light bulb 1. In addition, the DC/AC inverter 19 applies its output voltage to the electrode 6 of the discharge light bulb 1 via the primary and secondary winding of the igniter transformer T2 constituting the igniter circuit.

To start the discharge light bulb 1, the control section 20 of the DC/AC inverter 19 controls each switching device of the DC/AC inverter 19 in such a manner that the high voltage side of the ballast voltage is applied to the electrode 6, and that the low voltage side of the ballast voltage is applied to the electrode 7. In this state, the high voltage, which is obtained by rectifying the output voltage of the secondary winding S1 of the transformer T1, such as the DC voltage of 400 V, is applied to the discharge light bulb 1. Thus, the electrode 6 is supplied with +400 V with respect to the electrode 7 to which the low voltage side is applied. In this state, the power source circuit 5 rectifies the high voltage generated across the secondary winding S2 of the transformer T1 with the diode 17 and capacitor 18. The DC voltage generated is supplied to the capacitor 23 via the resistor 21 to charge the capacitor 23.

As the capacitor 23 is being charged, the voltage at the connection point of the resistor 21, gap switch 22 and capacitor 23 increases, thereby increasing the voltage across the gap switch 22 connected to the capacitor 23 via the primary winding of the igniter transformer T2. The gap switch 22, which has a characteristic of causing a breakdown when the voltage across the capacitor 23 reaches 800 V, for example, leads to a dielectric breakdown between the gaps, and is brought into a conduction state. When the gap switch 22 turns on in this way, the capacitor 23 comes to a discharge state, and the high voltage is applied to the end side terminal of the primary winding of the igniter transformer T2. Thus, the start pulse is generated across the secondary winding of the igniter transformer T2.

As described before, the secondary winding of the igniter transformer T2 has its start side terminal connected to the electrode 6. Accordingly, the negative potential start pulse is applied to the electrode 6. For example, the start pulse of about −25 kV is superimposed on the output of the DC/AC inverter 19, and is applied to the electrode 6. The start pulse, which oscillates as a quasi-sinusoidal wave as illustrated in FIG. 4, causes a dielectric breakdown between the electrodes 6 and 7 because of the initial half wave of the quasi-sinusoidal wave with −25 kV, thereby starting the discharge. Thus applying the negative potential high voltage to the electrode 6 starts the discharge light bulb 1.

Once the discharge light bulb 1 starts the discharge, the control section 20 of the DC/AC inverter 19 controls each switching device of the DC/AC inverter 19, and supplies the discharge light bulb 1 with the voltage with its polarity being reverse at the prescribed frequency. Starting the discharge enables the current to flow between the electrodes 6 and 7 of the discharge light bulb 1. The voltage between the electrodes 6 and 7 of the discharge light bulb 1 in the steady ballast state fluctuates between +85 V and −85 V.

As described before, to produce the dielectric breakdown between the electrodes of the discharge light bulb 1, it is advantageous to apply the negative potential start pulse to the electrode having a greater potential gradient. However, even if the dielectric breakdown occurs appropriately, since the current increases monotonically when a single polarity sinusoidal half wave pulse voltage is applied, the start of the discharge light bulb 1 sometimes cannot be achieved because of the following process.

The single polarity (the initial quasi-sinusoidal half wave of the start pulse) of the narrow pulse width (short time) start pulse causes a local dielectric breakdown near the electrode 6 by the negative high voltage. The electrons e emitted between the electrodes by the dielectric breakdown collide with gas atoms sealed between the electrodes, thereby increasing the resolved ions pi and electrons e in an avalanche. Although the increasing ions pi and electrons e between the electrodes brings about a voltage drop across the electrodes of the discharge light bulb 1, enough time cannot always be obtained to achieve such a large current as to reduce the voltage across the electrodes to less than 400 V, the output voltage of the DC/DC converter. If the current flowing through the discharge light bulb 1 stops before supplying the current from the DC/DC converter, or more specifically, from the smoothing capacitor 14 and the like, the discharge light bulb 1 cannot be turned on during the cycle of the start pulse.

To increase the current flow sufficiently between the electrodes using the start pulse with a narrow pulse width (short time), that is, using a single-period start pulse, or more specifically, the start pulse consisting of the initial quasi-sinusoidal half wave and the following reverse quasi-sinusoidal half wave, the initial quasi-sinusoidal half wave increases many ions pi in an avalanche between the electrodes, and the following reverse quasi-sinusoidal half wave attracts them to the electrode 7 to which the negative voltage is just applied. The ions pi produced by the initial quasi-sinusoidal half wave are also generated near the electrode 7.

As described above, the electrode 7 that has just been switched to the negative voltage attracts many ions pi so that these ions pi collide against the electrode 7, thereby generating additional secondary electrons e. Thus making effective use of the single period start pulse can increase the current flow between the electrode quickly. As a result, the voltage across the electrodes of the discharge light bulb 1 can be reduced below the output voltage of the DC/DC converter in the single period of the start pulse.

Therefore operating the reverse quasi-sinusoidal half wave following the initial quasi-sinusoidal half wave in synchronism with the output voltage of the DC/AC inverter 19 in such a manner that their voltage polarity agrees causes the charges stored in the capacitor 14 and the like in the DC/DC converter to be supplied to the electrodes of the discharge light bulb 1 whose voltage is dropped by the ions pi and electrons e which increase sufficiently within the discharge light bulb 1. This enables the current flow between the electrodes to increase quickly, and enables the glow discharge to shift to the arc discharge, thereby being able to turn on the discharge light bulb 1 more positively.

In other words, to turn on the discharge light bulb 1 positively, it is preferable that the start pulse having the initial quasi-sinusoidal half wave of the negative potential (−25 kV illustrated in FIG. 6) be superimposed on the high potential side output voltage of the DC/DC converter (+400 V illustrated in FIG. 6) which is applied to the electrode 6 whose neighborhood has the greater potential gradient.

As described above, the present embodiment 1 is configured in such a manner as to alter the electric field generated around the electrodes 6 and 7 of the discharge light bulb 1 by grounding the reflecting mirror 2; to increase the potential gradient about the electrode 6 to which the high voltage is applied; and to superimpose on the electrode 6 the start pulse whose initial quasi-sinusoidal half wave is a negative high voltage. Thus, the present embodiment 1 offers an advantage of being able to turn on the discharge light bulb 1 easily in a short time.

Embodiment 2

Figure 7:
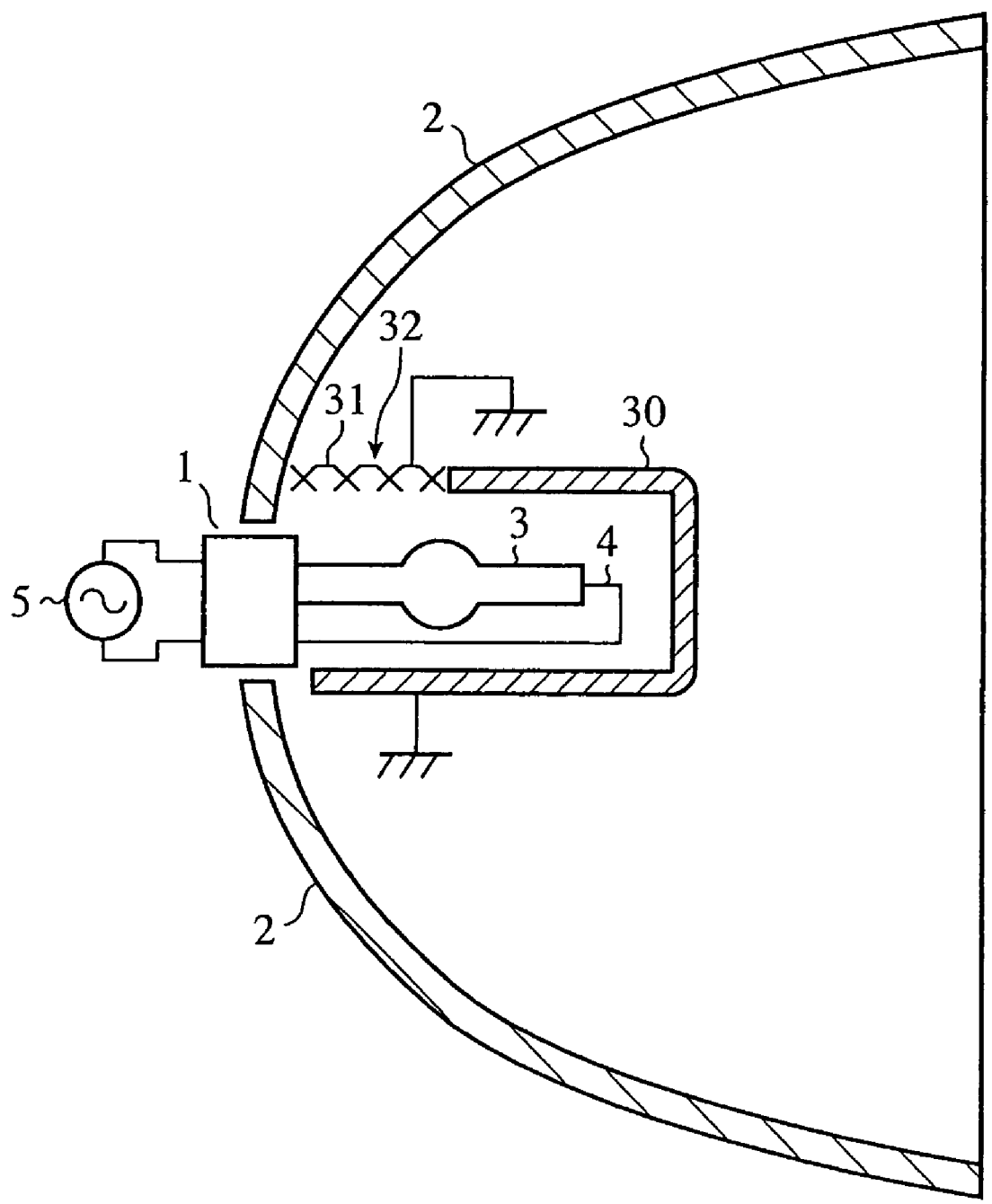
FIG. 7 is a diagram illustrating a configuration of the discharge lamp ballast apparatus of an embodiment 2 in accordance with the present invention.

FIG. 7 is a diagram illustrating a configuration of the discharge lamp ballast apparatus of an embodiment 2 in accordance with the present invention. In FIG. 7, the same or like portions to those of FIG. 1 and so forth are designated by the same reference numerals, and their duplicate description will be omitted. The discharge lamp ballast apparatus as shown in FIG. 7 has a shade (shading component) 30 for covering over the discharge light bulb 1 shown in FIG. 1, and an auxiliary electrode 31 placed near the light-emitting tube 3 and the like of the discharge light bulb 1. The remaining portion is configured in the same way as that of the discharge lamp ballast apparatus of the embodiment 1. The description of the portions configured in the same manner as those of the discharge lamp ballast apparatus of the embodiment 1 will be omitted.

The shade 30 and auxiliary electrode 31, which are composed of a conductive material, are grounded, for example, to have a prescribed potential. The shade 30 is a shading plate that covers part of the light-emitting tube 3, a light source, and that blocks the optical axis of the shaded portion in sending forth light. More specifically, the shade 30 is formed in such a fashion as to cover the front section of the light-emitting tube 3, to possess a projecting window 32 that exposes part of a side of the light-emitting tube 3, and to be fixed to the reflecting mirror 2.

The auxiliary electrode 31, which is a stick-like or netlike conductive material, is mounted at the projecting window 32, the opening of the shade 30, for example. The auxiliary electrode 31 has such a shape as to pass the light radiated from the light-emitting tube 3 to the reflection plane of the reflecting mirror 2. The shade 30 and auxiliary electrode 31 can be placed in such a manner that the auxiliary electrode 31 covers the projecting window 32, or the auxiliary electrode 31 is located close to the projecting window 32. In addition, when the discharge lamp ballast apparatus is a lighting fixture that does not require shading, it can possess only the auxiliary electrode 31.

Next, the operation will be described.

Arranging the electrically grounded shade 30 and auxiliary electrode 31 near the light-emitting tube 3 in this way will change the intensity distribution of the electric field generated around the light-emitting tube 3 and the discharge electrodes within the light-emitting tube 3, thereby producing the concentration of the electric field as in the neighborhood of the electrode 6 as described in the embodiment 1. The equipotential lines become narrower near the first discharge electrode having a greater potential difference between it and the shade 30 and auxiliary electrode 31. Accordingly, applying the voltage between the discharge electrodes having the concentration of the electric field from the power source circuit 5 makes the potential gradient between the discharge electrodes steeper, and facilitates producing a breakdown near the discharge electrode at which the concentration of the electric field occurs. When the electric field having such a high intensity is present between the discharge electrodes within the light-emitting tube 3, the start pulse with a lower highest voltage value can turn on the light-emitting tube 3. This makes it possible to employ lower capability components as the igniter circuit of the power source circuit 5 and the igniter transformer T2 shown in FIG. 5. In other words, it is possible to employ a smaller igniter transformer T2 and the like, and lower-voltage inexpensive circuit devices, which enables miniaturization and cost reduction.

The voltage applied to the discharge light bulb 1 shown in FIG. 7 is the same as that described in the embodiment 1, and the power source circuit 5 of FIG. 7 operates in the manner as described with reference to FIGS. 5 and 6. Since they are the same as described in the embodiment 1, their description will be omitted.

As described above, the present embodiment 2 is configured in such a manner as to dispose the shade 30 and auxiliary electrode 31 composed of the conductive material close to, the discharge light bulb 1; and to provide the shade 30 and auxiliary electrode 31 with the same prescribed potential by grounding them, for example. Thus, the present embodiment 2 offers an advantage of being able to produce the electric field having high intensity and steep potential gradient around the electrode within the light-emitting tube 3, and to start lighting with a low voltage start pulse.

Embodiment 3

The foregoing embodiments 1 and 2 are described by way of example in which a negative high voltage is applied to the electrode 6 whose neighborhood has the high intensity electric field. However, when the reflecting mirrors of the headlights mounted on a vehicle are grounded to set them at the same potential as the body of the vehicle, supplying the discharge lamps, the headlights, with a start pulse of a negative potential with respect to the potential of the reflecting mirror can offer the same effect and advantage as applying the negative high voltage to the electrode whose neighborhood has the high intensity electric field as described above.

In addition, when the shading component covering the discharge lamp is grounded and the discharge lamp is supplied with the start pulse of the negative potential with respect to the potential of the shading component, the same effect and advantage as those described above can be achieved.

INDUSTRIAL APPLICABILITY

As described above, the discharge lamp ballast apparatus in accordance with the present invention, which can start the discharge lamp efficiently using the negative high-potential start pulse, is suitable for the headlights of a vehicle or the like which must be turned on quickly and positively.

What is claimed is:

1. A discharge lamp ballast apparatus comprising a power source circuit mounted on a reflecting mirror, for applying a start pulse to a discharge lamp and applying a ballast voltage for turning on the discharge lamp thereto, the reflecting mirror being grounded and disposed around the discharge lamp, the discharge lamp comprising:

a discharge electrode on the reflecting mirror side; and a discharge electrode on a tip side of the discharge lamp which is located opposite to the discharge electrode on the reflecting mirror side; and wherein the ballast voltage having a positive potential with respect to a potential of said reflecting mirror is applied to said discharge electrode on the reflecting mirror side in advance, and the start pulse having a negative potential with respect to the potential of said reflecting mirror is superimposed on the ballast voltage and is applied on said discharge electrode on the reflecting mirror side.

2. The discharge lamp ballast apparatus according to claim 1, wherein the start pulse has a high-voltage initial quasi-sinusoidal half wave with a rise time of equal to or less than 150 nsec from 10% to 90% of a peak value.

3. The discharge lamp ballast apparatus according to claim 1, further comprising a shading component having a projecting window and covering the discharge lamp; and an auxiliary electrode mounted on said projecting window, wherein said shading component and said auxiliary electrode are grounded.

* * * * *